United States Patent [19]

Nishino

[11] Patent Number: 4,881,064
[45] Date of Patent: Nov. 14, 1989

[54] INFORMATION PROCESSOR HAVING CURSOR DISPLAY SYSTEM AND CONTROL

[75] Inventor: Tsutomu Nishino, Yokohama, Japan
[73] Assignee: Canon Kabushiki Kaisha, Tokyo, Japan
[21] Appl. No.: 94,087
[22] Filed: Sep. 4, 1987

Related U.S. Application Data

[63] Continuation of Ser. No. 702,679, Dec. 19, 1985, abandoned.

[30] Foreign Application Priority Data

Feb. 23, 1984 [JP] Japan .................................. 59-31445

[51] Int. Cl.$^4$ .............................................. G09G 3/00
[52] U.S. Cl. .................................... 340/709; 340/706; 340/711; 340/731
[58] Field of Search ............... 340/706, 709, 711, 721, 340/723, 731, 792; 400/83

[56] References Cited

U.S. PATENT DOCUMENTS

| | | | |
|---|---|---|---|
| 4,228,430 | 10/1980 | Iwamura et al. | 340/709 |
| 4,247,906 | 1/1981 | Corwin et al. | |
| 4,313,113 | 1/1982 | Thornburg | 340/709 |
| 4,410,958 | 10/1983 | Demke et al. | |
| 4,417,239 | 11/1983 | Demke et al. | 340/709 |
| 4,434,419 | 2/1984 | Couper et al. | 340/709 |
| 4,454,592 | 6/1984 | Cason et al. | 340/721 |
| 4,661,000 | 4/1987 | Shinbori | 400/83 |
| 4,710,821 | 12/1987 | Ohta | |

FOREIGN PATENT DOCUMENTS

| | | |
|---|---|---|
| 0044930 | 2/1982 | European Pat. Off. |
| 0116133 | 9/1980 | Japan ................ 340/721 |
| 58-176739 | 10/1983 | Japan . |
| 0177637 | 10/1984 | Japan ................ 340/721 |

OTHER PUBLICATIONS

English translation of Ashiba, No. 116/33/80.
IBM Technical Disclosure Bulletin by G. T. Webb, "Combination of Alphanumeric and Formatting Data on CRT Display", vol. 15, No. 7, Dec. '72.
IBM Technical Disclosure Bulletin by Ringle et al., "Multi-Page Document Display", vol. 23, No. 8, Jan. '81, pp. 3794–3795.
IBM Technical Disclosure Bulletin by Fackler et al., "Light-Emitting Diode Emitting Display", vol. 22, No. 7, Dec. '79, pp. 2614–2615.
IBM Techical Disclosure Bulletin by Anderson et al., "Shadow Cursor Cabability for Single Cursor", vol. 27, No. 1B, Jun. '84, pp. 479–480.

*Primary Examiner*—Gerald Brigance
*Assistant Examiner*—Jeffery A. Brier
*Attorney, Agent, or Firm*—Fitzpatrick, Cella, Harper & Scinto

[57] ABSTRACT

A character input/display apparatus comprises means for inputting information, means for designating a cursor position, a memory for storing the input information, a display having a first display unit for displaying a layout of the information stored in the memory and a second display unit for displaying a portion of the information stored in the memory, and control means for displaying a cursor on the first display unit and the second display unit in different manners.

11 Claims, 4 Drawing Sheets

INFORMATION PROCESSOR HAVING CURSOR DISPLAY SYSTEM AND CONTROL

This application is a continuation of application Ser. No. 702,679, filed Feb. 19, 1985, now abandoned.

BACKGROUND OF THE INVENTION

1. Field of the Invention

The present invention relates to a character input/display apparatus and more particularly to a character input/display apparatus which displays an input character data from a keyboard.

2. Description of the Prior Art

An example of prior art input/display apparatus for displaying input data from a keyboard is one that uses a CRT screen display. However, when a screen display is used, the overall system is of large scale and the cost thereof increases. A one-line display for displaying one line of input data has been known. It allows a small scale system and reduces the overall cost, but since only one line of data is displayed operability in inputting, editing and correcting data is poor.

SUMMARY OF THE INVENTION

It is an object of the present invention to provide a character input/display apparatus which uses a small size display unit such as a one-line display unit and allows effective utilization of the display by cursor display system and control, improves operability in inputting, editing, and correcting data and renders the character display compact, low cost and easy to handle.

DETAILED DESCRIPTION OF THE PREFERRED EMBODIMENTS

Figure 1:
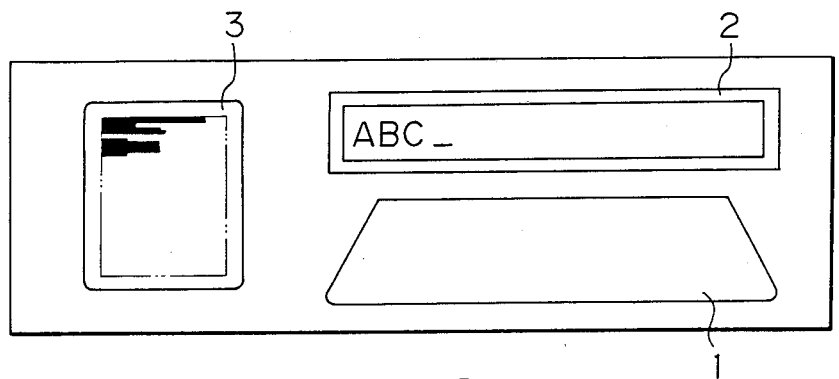
FIG. 1 shows an overall view of a character input/display.

FIG. 1 shows an overall view of a character input/display apparatus which displays input data from a keyboard. Numeral 1 denotes a keyboard for inputting a data. It includes character keys, cursor keys for controlling a cursor and function keys for performing various functions. One line of input data inputted by the keyboard 1 is displayed on a display unit 2 which has N ($N \geq 2$) display digits. Numeral 3 denotes a format display unit which displays each digit of input data by one dot. It has M ($M > N$) dots and L ($L > 3$) lines.

The data inputted by the keyboard 1 is sequentially displayed on the character display unit 2 from left to right, and when all digits of the character display unit 2 have been displayed, the displayed characters are shifted left and a new input data is displayed at the right end. On the other hand, the data overflown from the character display unit 2 are sequentially displayed on the format display unit 3 from left to right with each digit being displayed by one dot. When a carriage return key is depressed, as many dots as the number of display digits of the character display unit 2 are displayed on the format display unit 3, following the existing dots, and additional dots may be displayed in the next line. On the other hand, the character display unit 2 is cleared, a cursor is displayed at the left end, and the new input data is sequentially displayed from left to right. In this manner, the input data are sequentially displayed on the character display unit 2 and the format display unit 3.

Figure 2:
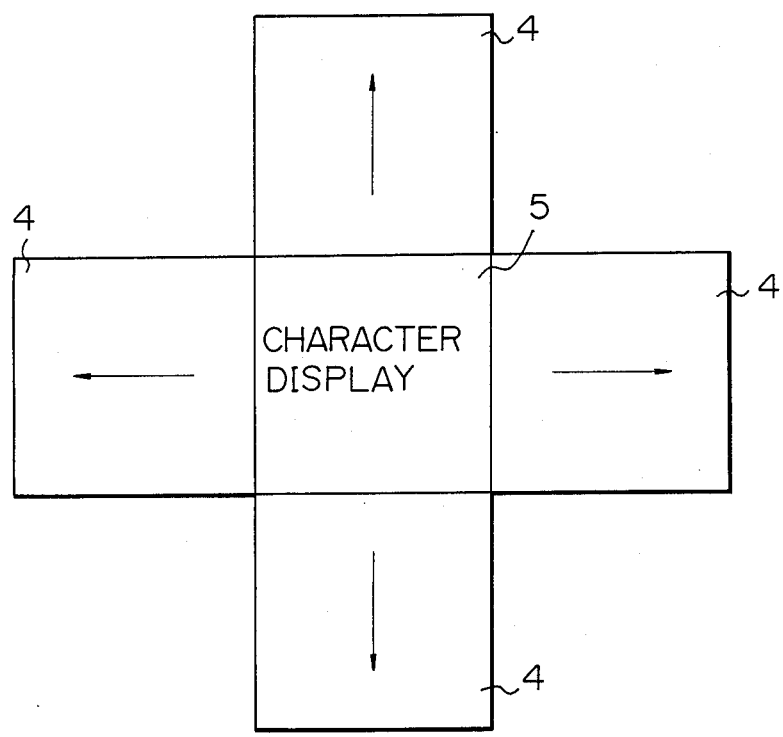
FIG. 2 is an enlarged plan view of a cursor control key on a keyboard.

FIG. 2 is an enlarged view of a cursor control key unit on the keyboard 2. Numeral 4 denotes a cursor control key which is used to shift the cursor in a direction of an arrow. By depressing those cursor control keys, the cursor can be shifted to any desired point on the character display unit 2 and the format display unit 3. Numeral 5 denotes a character display key. By depressing the character display key 5 when the cursor is on the format display unit 3, the data corresponding to the position designated by the cursor can be displayed on the character display unit 2.

Figure 3:
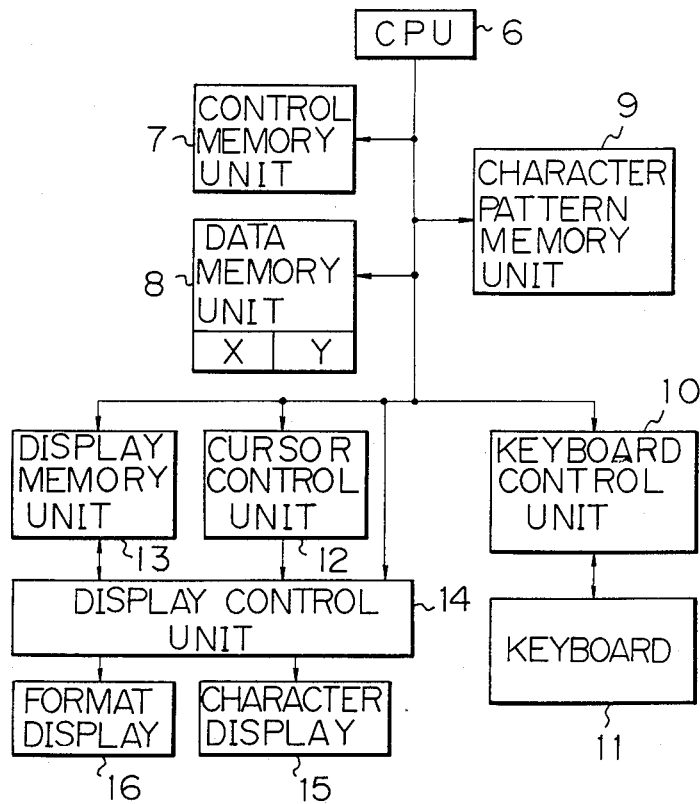
FIG. 3 is a block diagram of major portions of the character input/display apparatus.

FIG. 3 shows a block diagram of the character display. Numeral 6 denotes a CPU which controls an overall apparatus. Connected to the CPU 6 are a control memory 7 which is a read-only memory (ROM) which stores therein procedures shown in FIGS. 4 and 5, a readable and writable data memory (RAM) 8 which stores therein data and cursor positions X, Y and a read-only character pattern memory (ROM) 9 which stores therein character patterns and format display patterns. A keyboard control unit 10 is connected to a keyboard 11 to control it. A display memory unit 13 for storing therein the display patterns and a cursor control unit 12 are connected to a display control unit 14. A character display unit 15 corresponding to the character display unit 2 of FIG. 1 and a format display unit 16 corresponding to the format display unit 3 of FIG. 1 are connected to the display control unit 14.

The data inputted by the keyboard 11 is stored in the data memory unit 8 through the keyboard control unit 10 and the CPU 6 causes the character pattern memory unit 9 to generate the character pattern corresponding to the input data, and transfers the pattern to the display memory unit 13 to render the display units 15 and 16 to display the character through the display control unit 14.

The operation of the apparatus is now explained with reference to flow charts shown in FIGS. 4 and 5.

Figure 4:
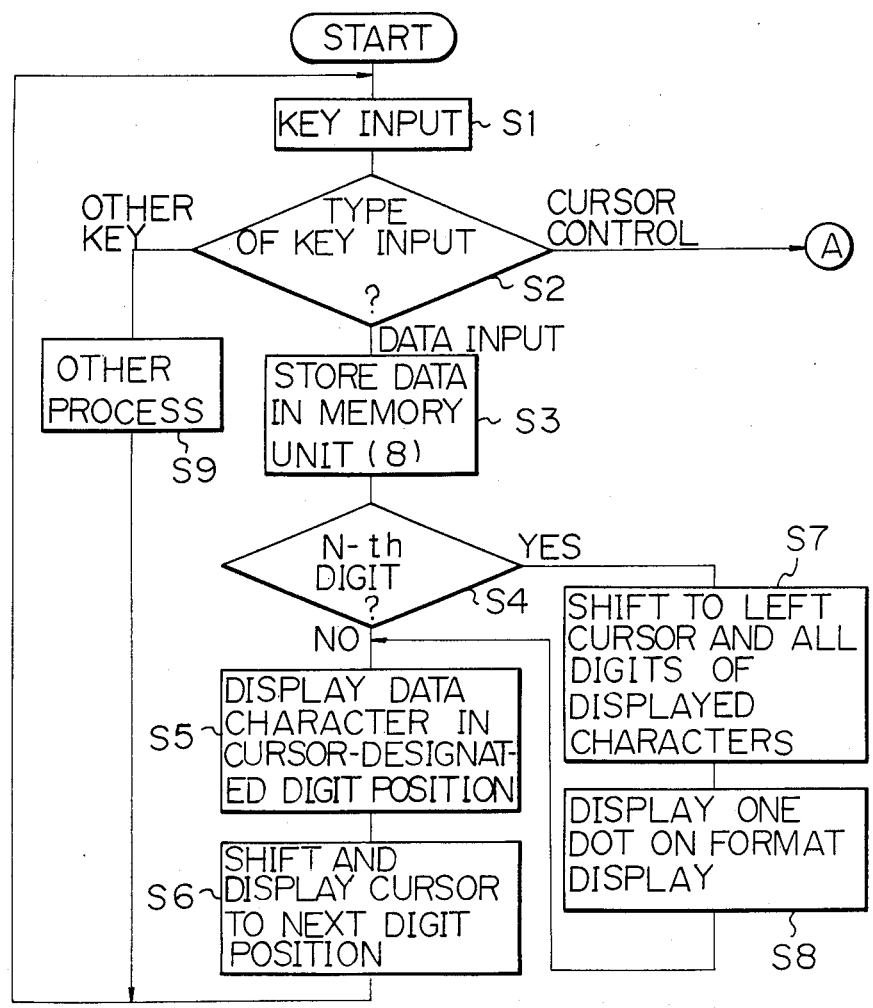
FIG. 4 is a flow chart illustrating a control operation of a CPU.
Figure 5:
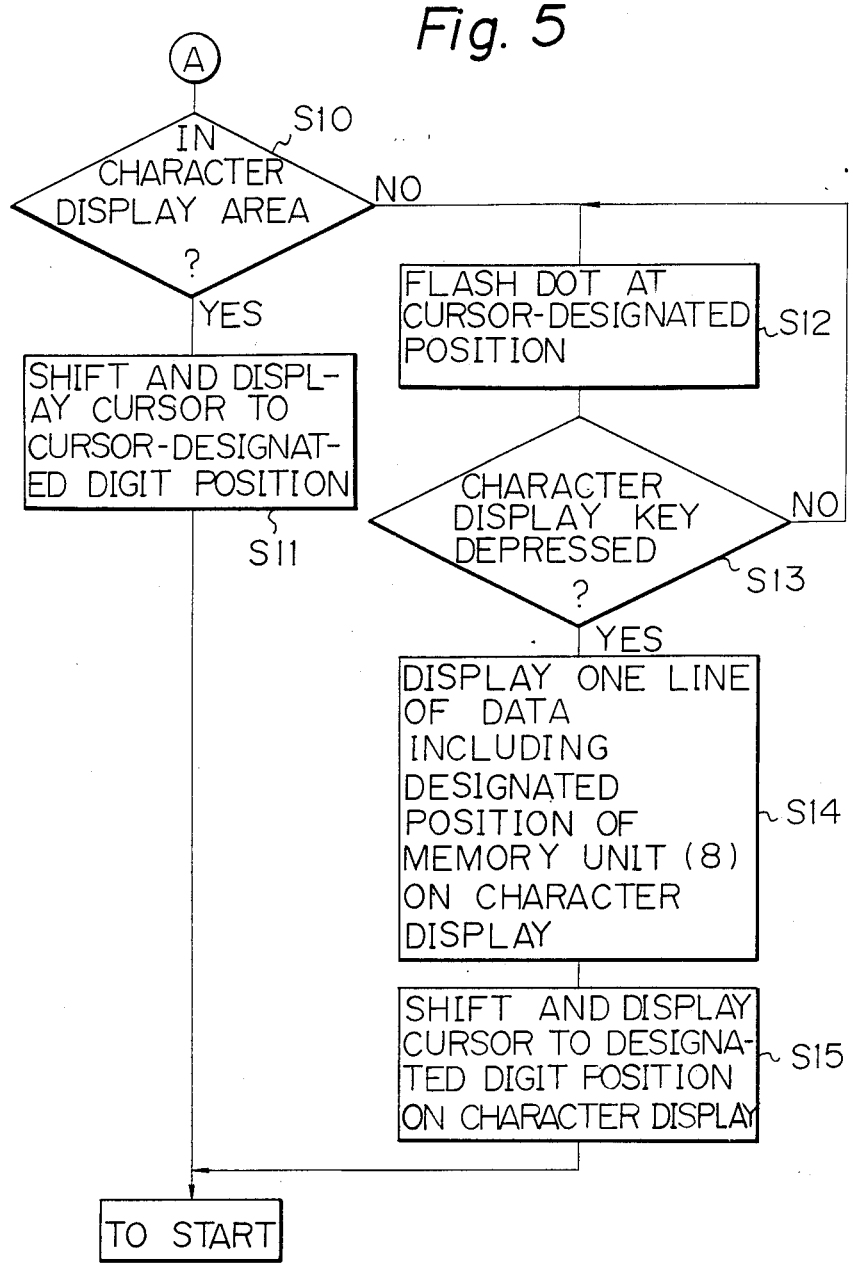
FIG. 5 is a flow chart of a control for a cursor control key input unit.

In a step S1 of FIG. 4, a key input is effected through the keyboard 11. When the key input is effected, the type of key input, that is, a data input, a cursor control input or other key input is discriminated in a step S2. If it is the cursor control input, the process proceeds to a step S10 of FIG. 5, and if it is other key input, the process proceeds to a step S9 where appropriate processing is carried out. Then, the process returns to the step S1. If it is the data input, the process proceeds to a step S3 to store the data into the memory unit 8. Thereafter, the input data is sequentially stored into the memory unit 8. In a step S4, a digit number of the input data in the display data is checked. If it is an N-th digit of the display data, the process proceeds to a step S7 to shift the cursor and all displayed characters to left. In a step S8, one dot is displayed on a new line of the format display unit. If it is not the N-th digit, the process proceeds to a step S5 to generate a character pattern corresponding to the input data from the character pattern memory 9, transfer it to the memory unit 12 and display it on the character display unit 15 and the format display unit 16 under the control of the display control unit 14, at the digit position designated by the cursor. In a step S6, the CPU 6 sends a cursor address to the cursor control unit 12 to shift the cursor to the next digit position and display it on the character display unit 15 through the display control unit 14. Then, the process returns to the step S1 and the similar steps are repeated for each data input so that the input data are sequentially displayed on the character display unit 15 from left to right.

When the N-th digit data is inputted, the process proceeds to a step S7 where all character patterns in the display memory unit 13 are shifted to the left by one digit so that the characters displayed on the character display unit 15 are shifted to the left by one digit. The cursor address is sent to the cursor control unit 12 to display the cursor on the character display unit 15 through the display control unit 14. Then, the process proceeds to a step S8 where one-dot display pattern is sent to the display memory 13 to display the one-dot on the format display unit 16 through the display control unit 14.

Then, the process proceeds to the step S5 to carry out the processing described above. If the character is inputted to the (N-1)th digit position, characters are displayed in the 1st to (N-1)th digit positions on the character display unit 15 and the cursor is displayed at the N-th digit position. In the step S8, one digit overflown from the character display unit 15 is displayed by a dot in a new line on the format display unit 16.

Similar steps are repeated for each input data so that the new input data is stored in the data memory unit 8 and displayed at the (N-1)th digit position of the character display unit 15. Each digit of input data is displayed by a dot on the format display unit 16.

The operation for editing and compiling the input data by operating the cursor control keys is explained with reference to a control flow chart of FIG. 5.

When the cursor control key is depressed, the process proceeds to the steps S1 and S2–S10. Whether the position designated by the cursor control key is within the character display unit 15 or not is determined based on the content of the cursor register Y. If the decision is NO, the process proceeds to a step S12, and if the decision is YES, the process proceeds to a step S11. In the step S11, the designated cursor address is sent to the cursor control unit 12 to shift the cursor and display the cursor on the character display unit 15 through the display control unit 14. After the cursor has been displayed at the designated position, the process returns to the start step.

If the designated cursor position is beyond the character display area, the process proceeds to a step S12 where the cursor address is sent to the cursor control unit 12 and the dot at the position designated by the cursor on the format display unit 16 is flashed on the display control unit 14 to indicate the position designated by the cursor. Then, the process returns to the step S12 where the dot at the designated position is flashed until the character display key is depressed. When the character display key is depressed, the process proceeds to a step S14 where character patterns corresponding to one line of data which contains the data at the position designated by the cursor, stored in the data memory unit 8 are generated by the character pattern memory 9 and sent to the character memory unit 14 to display them on the character display unit 15. Then, the process proceeds to a step S15 where the cursor control unit 12 sends the cursor address to display the cursor at the designated position on the character display unit 15 through the display control unit 14. Then, the process returns to the start step and the cursor control process is terminated.

As described above, the character input/display of the present invention includes means for shifting and displaying the cursor not only on the character display unit which displays the input data but also on the format display device which displays each digit of the input data by one dot so that the data in the data memory designated by the cursor can be displayed on the character display unit. Accordingly, the operability in inputting, editing and correcting data is significantly improved and a small size display instead of a screen display can be used. Accordingly, the overall apparatus is compact and the manufacturing cost thereof is reduced.

What I claim is:

1. An information processor comprising:
designation means for designating a cursor position;
memory means for storing information;
display means including a first display unit for displaying in dot form corresponding to a visual format information stored in said memory means and a second display unit for displaying in character form a portion of the information stored in said memory means;
cursor memory means for storing a cursor position designated by said designation means; and
cursor display means for displaying a cursor on said second display unit whenever the cursor position stored in said cursor memory means is designated in a position included in the portion of information displayed on the second display unit and for displaying a cursor on the first display unit whenever the cursor position stored in said cursor memory means is not designated in a position included in the portion of information displayed on the second display unit.

2. An information processor according to claim 1, wherein said display means displays as a dot on said first display unit information corresponding to one character of said second display unit.

3. An information processor according to claim 1, wherein said cursor display means causes the cursor displayed on the first display unit to blink whenever the cursor designated by said designation means is not designated in the portion of information displayed on the second display unit.

4. An information processor according to claim 1, wherein said second display unit of said display means is a one line display.

5. An information processor according to claim 1, wherein said cursor display means includes means for providing correspondence between display addresses of a format display pattern as displayed on said first display unit and display addresses of a character display pattern as displayed on said second display unit.

6. An information process according to claim 1, further comprising input means being capable of inputting information at the cursor position designated by said designation means; and means for causing, when the cursor position stored in the cursor memory means is not designated in a position included in the portion of information displayed on the second display unit, and when information is input by said input means, the second display unit to display in character form a portion of information corresponding to a portion of information displayed in dot form on the first display unit at the location designated by the cursor position on the first display unit.

7. An information processor comprising:
designation means for designating a cursor position;
display means including a first display unit for displaying in dot form corresponding to a visual format information stored in said memory means and a second display unit for displaying in character form a portion of the information stored in said memory means;
cursor memory means for storing a cursor position designated by said designation means, and
cursor display means for displaying a cursor on the first display unit when the cursor position stored in said cursor memory means is not designated in a position included in the portion of information displayed on the second display unit;
said cursor display means further displaying a cursor on the second display unit only when the cursor position stored in the cursor memory means is designated in a position included in the portion of information displayed on the second display unit.

8. An information processor according to claim 7, wherein said first display unit displays as a dot information corresponding to one character of said second display unit.

9. An information processor according to claim 7, wherein said cursor display means causes the cursor displayed on the first display unit to blink whenever the cursor position designated by said designation means is designated in a position not included in the portion of information displayed on the second display unit.

10. An information processor according to claim 7, wherein said second display unit of said display means is a one line display.

11. An information processor according to claim 7, wherein said cursor display means includes means for providing correspondence between display addresses of a format display pattern as displayed on said first display unit and display addresses of a character display pattern as displayed on said second display unit.

* * * * *

UNITED STATES PATENT AND TRADEMARK OFFICE
CERTIFICATE OF CORRECTION

PATENT NO. : 4,881,064

DATED : November 14, 1989

INVENTOR(S) : Tsutomu Nishino

It is certified that error appears in the above-identified patent and that said Letters Patent is hereby corrected as shown below:

ON THE TITLE PAGE

[63] Related U.S. Application Data:

Line 1, "Continuation of Ser. No. 702,679, Dec. 19, 1985, abandoned." should read --Continuation of Ser. No. 702,679, Feb. 19, 1985, abandoned.--.

COLUMN 1:

Line 50, "a" (second occurrence) should be deleted.

COLUMN 4:

Line 58, "information process" should read --information processor--.

Signed and Sealed this

Twenty-eighth Day of July, 1992

Attest:

DOUGLAS B. COMER

*Attesting Officer*  *Acting Commissioner of Patents and Trademarks*